UNITED STATES PATENT OFFICE.

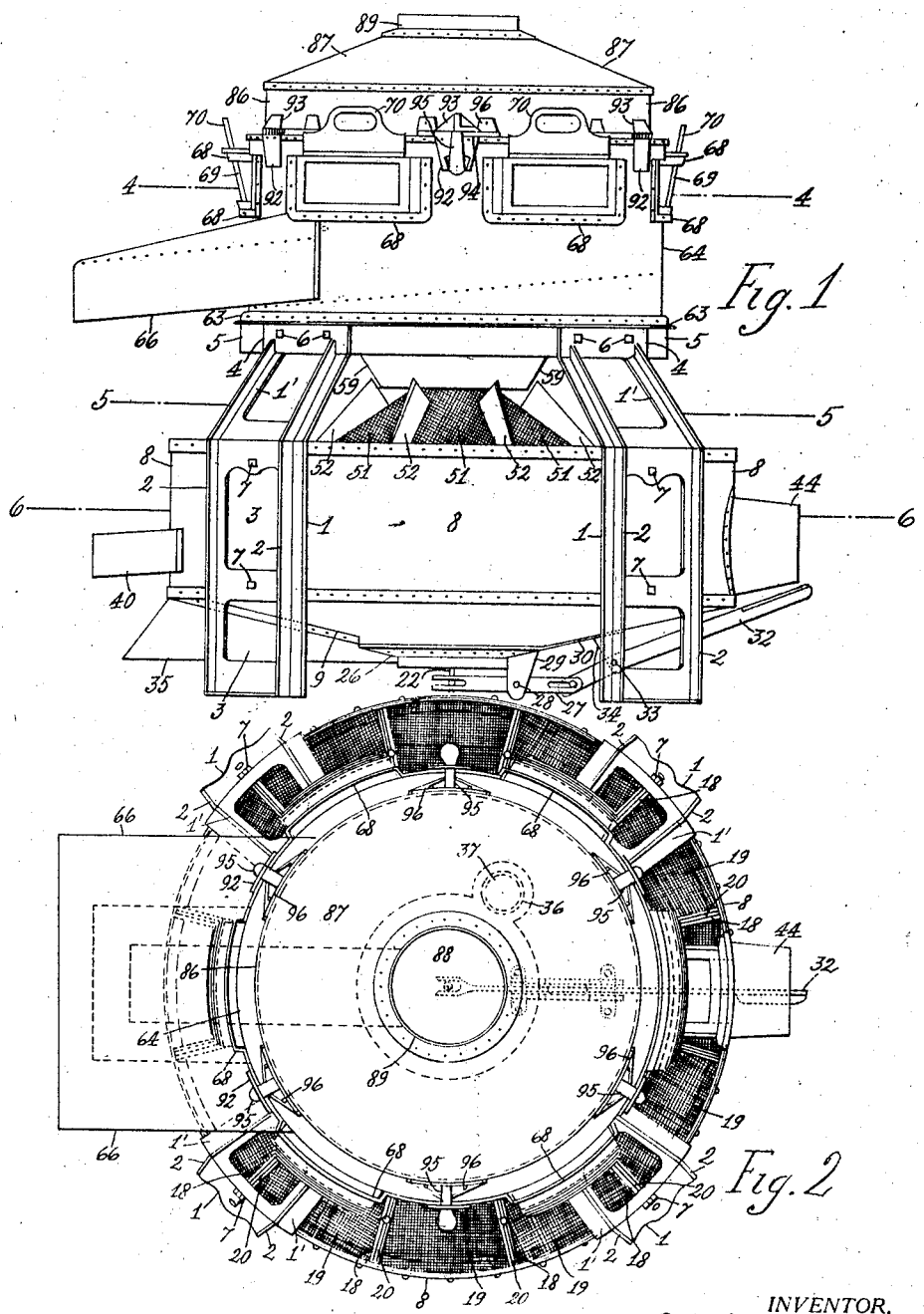

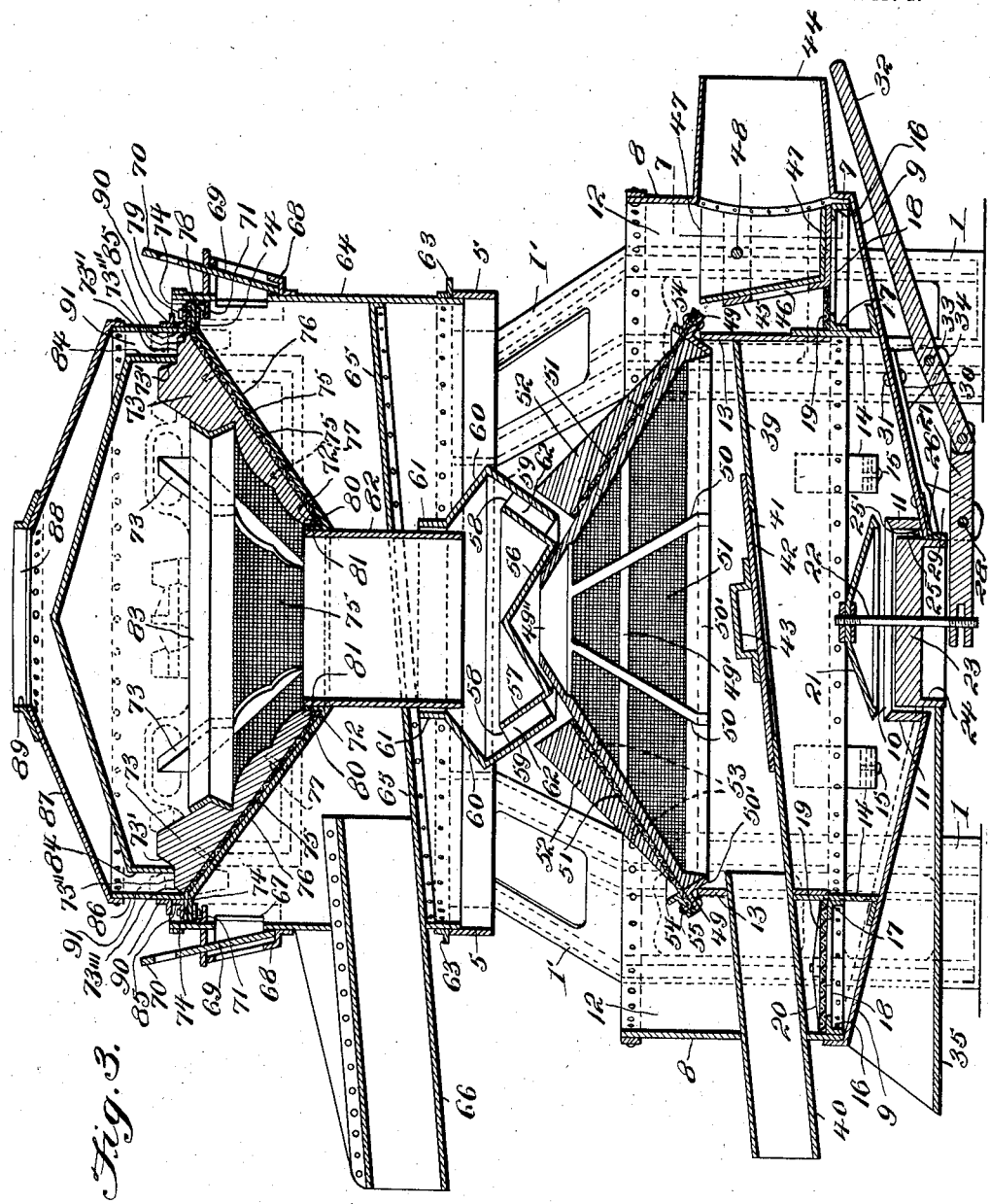

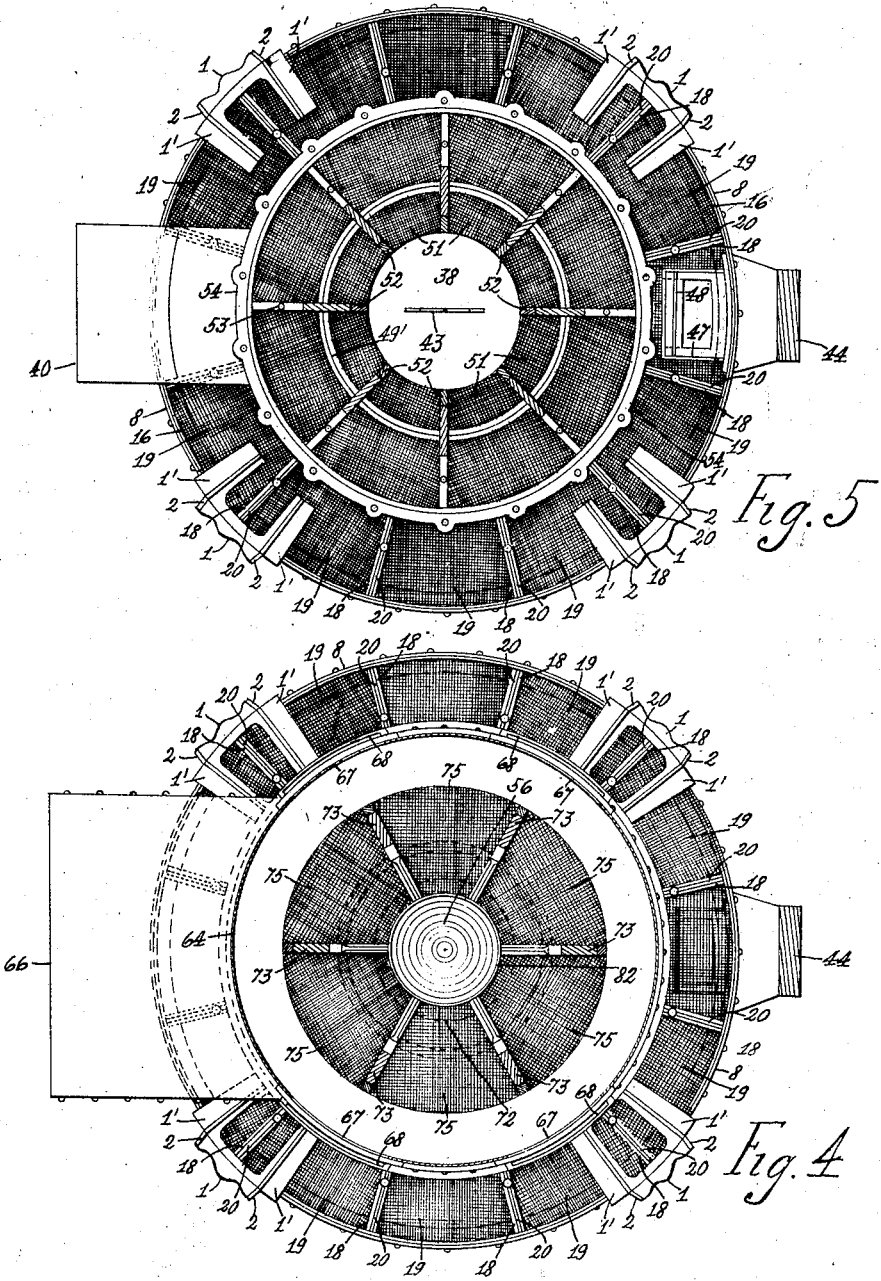

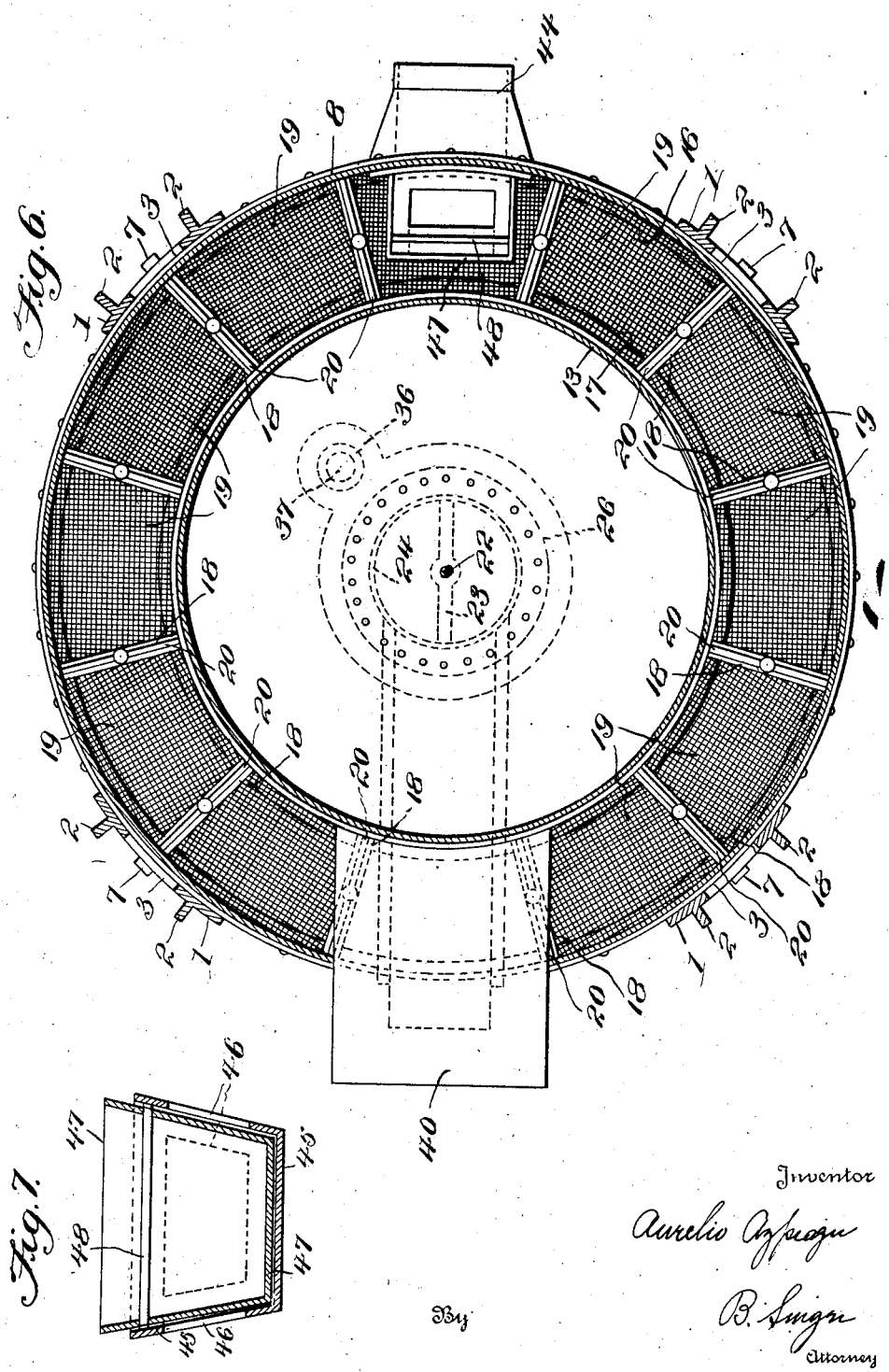

AURELIO AZPIAZU, OF HABANA, CUBA.

APPARATUS FOR FILTERING SUGAR-CANE JUICE OR THE LIKE.

1,332,877. Specification of Letters Patent. Patented Mar. 9, 1920.

Application filed October 14, 1918. Serial No. 258,021.

*To all whom it may concern:*

Be it known that I, AURELIO AZPIAZU, a citizen of the Republic of Cuba, and a resident of Habana, Republic of Cuba, have invented certain new and useful Improvements in Apparatus for Filtering Sugar-Cane Juice or the like, of which the following is a full, clear, and exact specification.

This invention relates to apparatus for filtering sugar cane juices or the like, and its object is to provide an apparatus of this type which is of improved construction and in which the filtering is effected fractionally or in a plurality of successive operations in each of which is treated the material remaining as residue in the next proceeding operation, and it comprises a plurality of filtering surfaces conical in shape and arranged one above the other in order that the liquid may fall by gravity from a filtering surface to the following one, in combination with means for cleansing the apparatus whenever this may be deemed necessary, and the apparatus being also divided in parts which can be easily set apart, for handling the same.

In the drawings:

Figure 1 is a front elevation of the filtering apparatus forming the subject-matter of the present invention.

Fig. 2 is an upper plan view of the apparatus.

Fig. 3 is a central vertical section of the apparatus.

Fig. 4 is a horizontal section of the apparatus on line 4—4 of Fig. 1.

Fig. 5 is a horizontal section of the apparatus on line 5—5 of Fig. 1.

Fig. 6 is a horizontal section of the apparatus on line 6—6 of Fig. 1.

And Fig. 7 is a detail on vertical section on line 7—7 of Fig. 3.

The apparatus is composed of a frame comprising four uprights 1 disposed equidistant apart in a circular arrangement and each of which is formed of an arcuate plate reinforced with outwardly projecting rims 2 and having large central openings 3, and its upper part 1' inclined inwardly and terminating in a vertical flange 4, and it also comprises a horizontal ring 5 connecting the four flanges 4 of the uprights 1, by being fixed thereto by bolts 6.

Inside of the uprights 1 is suspended fixedly thereto by means of bolts 7 a cylindrical tank 8 having an inverted conical bottom 9 having a central opening 10 and a vertical flange 11 around said opening. Within said tank is formed an annular chamber 12 between the wall of said tank and another cylindrical inner wall 13 concentric with respect to the first one and of less height than the same and which extends a certain distance above the conical bottom 9 of the tank, and is supported on the latter by means of upright plates 14 angularly shaped and whose lower flanges are fixed to the bottom 9 by means of rivets or screws 15. In the lower part of the annular chamber 12 is provided a frame formed by two angular plates 16 and 17 the first fixed to the outer wall 12 and the second to the inner wall 13 and connected together by means of spokes 18 and upon this frame is supported a metallic screen 19 comprising sectors which are held in position by means of clips 20 which correspond vertically with the spokes 18. Hence a filtering annular surface is formed in the annular chamber 12.

The upper edge of the vertical flange 11 is beveled to receive the lower peripheral edge of a conical valve 21 arranged to close by its own weight the opening 10 and carried on the upper threaded edge of a vertical stem 22 slidably mounted through a central hole in a bridge 23 diametrally placed and integral with a short cylinder 24 arranged in the interior of the opening 10 concentrical with and at a certain distance from the annular flange 11 and leaving therebetween an annular path 25 closed by a horizontal flange 25' projecting from cylinder 24 and having a slot at one side, said cylinder 24 being secured to bottom 9 of tank 8 by a cross-sectionally angular annular piece 26 fast by bolts or rivets to the lower edge of cylinder 24 and below the conical bottom 9. The lower end of said vertical stem 22 is pivotally mounted within the forked end of a lever 27 pivoted at 28 on a double lug 29 forming part of a bracket 30 secured by rivets 31 in radial position under the conical bottom 9, the other end of the lever 27 being connected to the forked end of another inclined lever 32 pivotally mounted at 33 on another double lug 34 forming part of the bracket 30.

The vertical annular path 25 terminates at one side and below slot of flange 25' on a channel 35 secured under the conical bottom 9 and this bottom has at the opposite side to channel 35 an opening 36 to which is connected a tube 37 for the inlet of cleansing water.

The inner chamber 38 of tank 8 is closed nearly at the half of its height by a circular bottom 39 inclined toward a lateral channel 40 closed at its top and which is also inclined and which passes through the annular chamber 12 and comes out of tank 8, and the inclined bottom 39 is provided with an opening 41 closed by cover 42 having an upper handle 43. At the opposite side with respect to the channel 40, the tank 8 has a discharge pipe 44 whose communicating opening with annular chamber 12 is closed by an overflow and draining valve formed by a cage or rectangular shape-casing 45, provided with openings 46 on its lateral walls and open on the upper side and inside of which is fitted the proper valve which consists of a casing 17 of greater height on the upper side and on the side facing the opening of communication with pipe 44 and which is provided with an inner handle 48 formed by a horizontal rod rigidly connected at the ends to the end walls of said casing 47.

On the upper edge of the inner wall 13 of tank 8 a conical frame formed by a lower ring 49, an intermediate ring 49' and an upper ring 49'' connected together by spokes 50 and which presents a lower flange 50' which bears on said wall 13 and upon this frame is located a wire screen 51 that terminates below the upper ring 49'' of the frame and which is secured in position by means of radial pieces 52 which correspond vertically with the spokes 50 of the frame and are fixed thereto by screws 53 passing through holes in said spokes and by means of an angular section rim 54 which is secured on the lower ring of frame 49 by means of screws 55.

On the upper ring 49'' of the conical frame a cone 56 concentrically bears which forms a body with an inverted truncated conical flange 57 upwardly directed and from which projects outwardly a plurality of radial strips 58 which rigidly hold in concentric position with respect to said flange an inverted truncated cone 59 which at the upper side forms a body with a truncated cone 60 ending at its upper end in a cylindrical flange 61, there remaining between the flange 57 and the inverted truncated cone 59 an annular path 62 across which extend radial strips 58 which are equidistant apart.

Within the horizontal ring 5 of the frame of the apparatus there is supported by means of an angular flange 63 exteriorly projecting from its periphery a cylindrical tank 64 provided with a bottom 65 inclined toward one side where it is provided with a discharging channel 66, the wall of said tank 64 having on its upper part a plurality of register openings 67 equidistant from each other and which are protected with frames 68 of angular section and provided with flanges to be fixed to the wall of the tank 64, the frames 68 diverging upwardly and in these frames are lodged and guided sliding gates 69 which close said openings 67 and each of which has a handle 70. Said tank 64 has secured near its upper edge an annular cross-sectionally angular flange 71 serving as support to a frame of inverted truncated conical shape formed by a lower ring 72 from which lead upward a plurality of spokes 73 equidistant apart and whose upper ends are connected by a horizontal projecting ring 74, each spoke 73 being vertically widened toward its outer portion where it is provided with a cut forming an inner inclined shoulder 73', a seat 73'' and an outer inclined shoulder 73''' and on this conical frame is fixed a wire screen 75 divided in sections that are secured by means of radial clips 76 which are fixed by means of screws 77 to said spokes 73 and by means of a rim of angular section 78 which is secured by means of screws or rivets 79 underneath the upper ring 74 of the conical frame, said rim 78 bearing directly against the angular flange 63 of tank 64. The conical frame has secured to its lower end a conical ring 80 provided with a vertical flange 81 to which is fixed a vertical tube 82 of suitable diameter and which has its lower end arranged inside and spaced from the cylindrical flange 61 of the trunk-cone body 60 previously described. In the interior of the conical frame 72, 73, 74 there is lodged a ring 83 of double inverted trunk-cone shape, the lower flange of which fits in notches in the spokes 73.

The seat 73'' of the raised spokes 73 serves for receiving near the shoulder 73' thereof the lower edge of a bell 84 whose upper portion is conical and in the annular notch formed between a vertical flange 85 projecting from the upper ring 74 of the conical frame 72, 73, 74 and the shoulder 73''' of spokes 73 fits the cylindrical portion 86 of a cover whose upper portion 87 is conical and presents an opening 88 around which is fixed a ring of angular section 89 arranged to receive an inlet pipe for the sugar cane syrup or any other liquid to be filtered, the cylindrical portion 86 of said cover having an angular outer flange 90, which bears on the edge of the vertical flange 85. Said cylindrical portion 86 of the cover is spaced from the cylindrical portion of bell 84 thus forming an annular chamber 91 which serves as a path for the liquid.

The upper edge of the cylindrical tank 64 has supports 92 fixed thereto and spaced equidistant apart and forming upwardly raised lugs 93 each having a lateral slot 94, said supports receiving in their lateral slots 94 a series of arms 95 projecting radially from supporting plates 96 secured on the angular flange 90 of the cover 86 so that the cover is arranged concentrically with respect to tank 64.

The operation of the apparatus is as follows: Through the tube connected to the opening 88 of the upper cover 86 the sugar cane syrup or other liquid runs and falls on the conical upper portion of bell 84 and is distributed by the latter in the annular chamber 91 and passes from said chamber to the spaces between the raised spokes 73 of the inverted conical or funnel shaped frame 72, 73, 74 and runs inwardly and downwardly on the sections of wire screen 75 covering the sector openings of said frame, the liquid spreading in the form of a conical sheet on the sections of metallic screen 75 and thus securing a good filtration through the same when passing thereover. The liquid filtered through the wire screen 75 falls on the inclined bottom 65 and is discharged through the channel 66 outside of the apparatus, where it can be collected in an appropriate receptacle, and the residue of the filtration or non-filtered material which constitutes the impurities of the liquid, falls by its own weight in the interior of the vertical tube 82, and is received on the cavity of the conical bottom formed by the inner body 56, overflows the wall 57 and falls in the annular path 62 formed between said wall 57 and the lower part of the outer body 59, 60, 61 and is received on the upper ring of the conical frame 49'' from whence it is spread on the wire screen 51, covering the same between the squares 52 which guide the material downward at the same time that it is filtered through said wire screen. The filtered liquid falls on the inclined bottom 39 of chamber 38 and is discharged through the inclined channel 40, while the residue of the filtration or the material which has not been filtered through the wire screen 51 falls in the annular chamber 12 of the tank 8 and upon the wire screen 19 on which a new filtration takes effect, the filtered liquid being collected on the conical bottom 9 of tank 8 and being discharged from time to time through the opening 10 by means of the valve 21 and the levers 27, 32 as will be understood. The liquid passes through the annular vertical path 25 and the lateral slot of flange 25' toward the lateral channel 35 wherefrom it is collected. The last unfiltered residue remaining on the wire screen 19 is expelled from the apparatus when it reaches an injurious thickness by cleansing it with water which is injected through the inlet pipe 37, the valve 21 being then closed. In this manner the water fills the tank 8 passing upward through the wire screen 9 and overflows above the walls of the valve 47 which closes the direct communication with the discharging pipe 44 and falls inside of said valve to be discharged through said pipe 44. When it is desired to discharge the water of tank 8 after the cleansing operation is effected all that is required is to manually raise the valve 47 holding the rod 48 and the water passes to pipe 44 through the openings 46 of cage 45, which have thus been uncovered.

It is obvious that the details of construction of the apparatus can be varied without altering the spirit of the invention which is as pointed out in the following claims.

What I claim is:

1. An apparatus for filtering sugar cane syrup or the like, comprising a series of conical filtering surfaces arranged one above the other so that the residue of filtration in the upper filtering surface may fall upon the next lower filtering surface, an inclined bottom between each two successive filtering surfaces for receiving the liquid filtered in the upper filtering surface, channels to discharge the filtrated liquids from said intermediate bottoms, and conduits carrying the residue of filtration upon a filtering surface to the next lower filtering surface through the intermediate receiving bottom.

2. An apparatus for filtering sugar cane syrup or the like, comprising a plurality of conical filtering surfaces arranged one above the other so that the residue of filtration of the upper filtering surface may fall on the next lower filtering surface, an inclined bottom between each two successive filtering surfaces to receive the liquid filtered in the upper filtered surface, channels to discharge the filtered liquids on said intermediate bottoms, conduits carrying the residue of filtration upon a filtering surface to the next lower filtering surface through the intermediate bottom, means for distributing the liquid to be filtered on the upper filtering surface, and means for distributing in the form of a conical coating the residue of each filtration.

3. An apparatus for filtering sugar cane juice or the like, comprising an upper inverted conical filtering surface, means for distributing upon this filtering surface the liquid to be filtered, an inclined bottom arranged under said filtering surface for receiving the liquid filtered through the same, a channel to discharge the filtered liquid collected in such inclined bottom, a pipe leading downward from the lower part of said conical filtering surface and passing through said inclined bottom, a second conical filtering surface arranged under the last mentioned pipe, distributing means between the pipe and the second filtering surface for distributing upon the latter the residue of the filtration in the first filtering surface, an inclined bottom arranged under the second filtering surface for receiving the filtered liquid through the same, a channel to discharge the filtered liquid collected on that second inclined bottom, and means for receiving the residue of the filtration that drains from the second conical filtering surface.

4. An apparatus for filtering sugar cane juice or the like comprising an upper inverted conical filtering surface, means for distributing on this filtering surface the liquid to be filtered, an inclined bottom arranged under said filtering surface for receiving the liquid filtered through the same, a channel to discharge the filtered liquid collected on said inclined bottom, a pipe leading downward from an opening in the lower part of the inverted conical filtering surface and passing through the lower inclined bottom, a conical filtering surface under the pipe last mentioned, means arranged for distributing on the second filtering surface the residue of the filtration in the first filtering surface, an inclined bottom arranged under the second filtering surface for receiving the liquid filtered therethrough, a channel to discharge the filtered liquid collected in such second inclined bottom, a third filtering surface arranged under the lower edge of the second conical filtering surface, a bottom for receiving the liquid filtered through this third filtering surface, and means for introducing water upwardly for cleansing said third filtering surface and for expelling the residue of the third filtration that remains thereon.

5. Filtering apparatus of the class described, comprising a conical bell, means to supply the material to be filtered to said conical bell, a funnel-shaped filter below the bell, a discharge pipe for the unfiltered material, leading downwardly from the center of the said filter, means to discharge the material which passes through and drops from the filter; a conical filter below said discharge pipe, means to discharge the material which passes through and drops from said conical filter, means to collect the material which passes over said conical filter, and means to discharge such collected material.

In witness whereof I affix my signature.

AURELIO AZPIAZU.